United States Patent [19]

Plummer

[11] Patent Number: 4,557,803
[45] Date of Patent: Dec. 10, 1985

[54] CRACKING PROCESS CATALYST SELECTION BASED ON CATION ELECTRONEGATIVITY

[75] Inventor: Mark A. Plummer, Littleton, Colo.

[73] Assignee: Marathon Oil Company, Findlay, Ohio

[21] Appl. No.: 627,153

[22] Filed: Jul. 2, 1984

[51] Int. Cl.$^4$ .................. C10G 11/08; C10G 47/08
[52] U.S. Cl. .................. 208/108; 208/117; 585/742
[58] Field of Search ............. 208/115, 116, 117, 108, 208/230, 235, 248; 585/741, 742

[56] References Cited

U.S. PATENT DOCUMENTS

| | | | |
|---|---|---|---|
| 1,815,460 | 7/1931 | Chappell | 208/73 |
| 1,825,294 | 9/1931 | Wolcott | 208/117 |
| 2,113,028 | 4/1938 | Kuentzel | 423/116 |
| 2,125,235 | 7/1938 | Atwell | 585/517 |
| 2,146,667 | 2/1939 | Atwell | 585/532 |
| 2,342,073 | 2/1944 | Cheney | 585/742 |
| 2,360,700 | 10/1944 | McAllister et al. | 208/117 |
| 2,369,444 | 2/1945 | d'Ouville et al. | 208/46 |
| 2,388,007 | 10/1945 | Pardee et al. | 585/460 |
| 2,394,898 | 2/1946 | Cheney et al. | 585/742 |
| 2,475,358 | 7/1949 | Moore et al. | 585/737 |
| 2,768,935 | 10/1956 | Watkins | 208/113 |
| 3,324,192 | 6/1967 | Roebuck et al. | 585/460 |
| 3,501,416 | 3/1970 | Wald | 502/164 |
| 3,677,932 | 7/1973 | Hardesty et al. | 208/108 |
| 3,764,515 | 10/1973 | Kiovsky | 208/10 |
| 3,966,582 | 6/1976 | Cramer | 208/8 |
| 4,247,385 | 1/1981 | Gorin | 208/10 |
| 4,317,712 | 3/1982 | Farcasiu | 208/46 |
| 4,333,815 | 6/1982 | Vermeulen et al. | 208/10 |

OTHER PUBLICATIONS

Alul et al., "Alkylation of Benzene with 8-Methyl-1-nonene, V, Effect of the Catalyst on the Isomerization of Secondary Carbonium Ions," *J. Org. Chem.*, vol. 37, No. 25, 1972.

Bugle et al., "Oil-Shale Kerogen: Low Temperature Degradation in Molten Salts," *Nature*, vol. 274, No. 5671, pp. 578-580.

Boehme et al., "Optimal Insertion of Liquid Catalysts Based on Aluminum Chloride into Cationic Hydrocarbon Reactions," *Chem. Abstracts*, vol. 89, 1978, No. 89:460 83V.

Brown, H. C. and H. Pearsall, "The Catalytic Halides, I. A Study of the Catalyst Couple, Aluminum Chloride-Hydrogen Chloride, and the Question of the Existence of HAlCl$_4$," *J. Am. Chem. Soc.*, 73-4681-3, (1951).

Lien et al., "Rate of Isomerization of Cyclohexane," *Ind. and Eng. Chem.*, vol. 44, pp. 351-353, (Feb. 1952).

Richardson, R. L., and S. W. Benson, "A Study of the Hydrogen Chloride-Aluminum Chloride Systems," *J. Am. Chem. Soc.*, 73-5096-9, (1951).

Primary Examiner—D. E. Gantz
Assistant Examiner—O. Chaudhuri
Attorney, Agent, or Firm—Jack L. Hummel; Rodney F. Brown

[57] ABSTRACT

A process for producing lower molecular weight products from higher molecular weight hydrocarbon liquid feedstock components is provided wherein the feedstock is contacted with an optimum catalyst comprising a molten salt of a tetrachloroaluminate. Selection of the optimum catalyst is based on the electronegativity of the tetrachloroaluminate catalyst cation.

13 Claims, No Drawings

CRACKING PROCESS CATALYST SELECTION BASED ON CATION ELECTRONEGATIVITY

DESCRIPTION

1. Technical Field

This invention relates to a process for catalytically reacting hydrocarbon liquid feedstock components to obtain lower molecular weight products and, in particular, to a process for selecting a reaction catalyst having an optimum polarity based on the electronegativity of the catalyst cation.

2. Background Art

Of the many processes which convert hydrocarbon feedstock components into lower average molecular weight, more useful, hydrocarbon products, most involve cracking or hydrogenating the feed materials in the presence of a catalyst. These processes generally consume expensive hydrogen and/or reject carbon to a low value product. Exemplary processes are described in U.S. Pat. Nos. 3,966,582; 2,768,935; 4,317,712; 4,333,815; 1,825,294 and 3,764,515. These patents teach a wide variety of halide salts and mixtures thereof as reaction catalysts. U.S. Pat. Nos. 4,317,712 and 4,333,815 disclose mixing aromatic hydrocarbons with a coal or petroleum oil feedstock. The mixture is subsequently cracked using $ZnCl_2$ or $AlCl_3$ as Friedel-Crafts catalysts. U.S. Pat. Nos. 1,825,294 and 3,764,515 disclose using a gaseous mineral acid, such as HCl, as a promoter for the $ZnCl_2$ or $AlCl_3$ cracking catalysts.

Sodium tetrachloroaluminate ($NaAlCl_4$) is a known catalyst for a number of reactions. For example, U.S. Pat. Nos. 2,125,235 and 2,146,667 disclose polymerizing hydrocarbon gases, e.g., olefins, with an $NaAlCl_4$ catalyst. U.S. Pat. No. 2,342,073 discloses the use of $NaAlCl_4$ for isomerizing paraffins with an $NaAlCl_4$ catalyst. U.S. Pat. Nos. 2,388,007 and 3,324,192 teach alkylating aromatic hydrocarbons with an $NaAlCl_4$ catalyst. U.S. Pat. No. 2,113,028 teaches a method of regenerating double halide catalysts such as $NaAlCl_4$. $NaAlCl_4$, having an excess of NaCl, is utilized as a heat transfer medium in a process to produce raw shale oil from oil shale. See R. C. Bugle, et al, Nature, Vol. 274, No. 5671, pp. 578–580.

Hydrogen tetrachloroaluminate ($HAlCl_4$) is likewise a known catalyst for at least a small number of reactions, e.g., isomerization and condensation reactions. Lien et al, in an article entitled "Rate of Isomerization of Cyclohexane," *Industrial and Engineering Chemistry*, Vol. 44, pp. 351–353 (February 1952), disclose the effects of $AlCl_3$ and HCl catalysts under varying conditions on the rate of isomerization. Alul et al, "Alkylation of Benzene with 8-Methyl-1-nonene. V. Effect of the Catalyst on the Isomerization of Secondary Carbonium Ions," J. Org. Chem., Vol. 37, No. 25, 1972, teach that $AlCl_3$ in conjunction with HCl is a very strong catalyst which isomerizes secondary alkylbenzenes and dealkylates the tertiary isomer. Other catalytic uses of $AlCl_3$ and HCl are disclosed in "Optimal Insertion of Liquid Catalysts Based on Aluminum Chloride into Cationic Hydrocarbon Reactions," Boehme et al, *Chemical Abstracts*, Vol. 89, 1978, No. 89:46083V; "A Study of the Hydrogen Chloride-Aluminum Chloride System," by Ryden L. Richardson and Sidney W. Benson, *J. Am. Chem. Soc.*, 73-5096-9 (1951); and "The Catalytic Halides. I. A Study of the Catalyst Couple, Aluminum Chloride-Hydrogen Chloride, and the Question of the Existence of $HAlCl_4$," by Herbert C. Brown and Howard Pearsall, *J. Am. Chem. Soc.*, 73-4681-3 (1951).

A problem common to this proliferation of catalytic processes is the inability of the catalyst to effectively attract feedstock components to the reaction site, retain them for reaction, and release the resultant product from the reaction site. The products have little practical value if separation from the catalyst is difficult if not impossible. A need exists for a catalytic process wherein desirable lower molecular weight products obtained from a hydrocarbon liquid feedstock are readily recoverable from the catalyst without substantial further processing. More particularly, a method is needed of selecting an optimum catalyst in the above catalytic process.

DISCLOSURE OF THE INVENTION

The present invention is a catalytic process wherein the molecular weights of one or more components of a hydrocarbon liquid feedstock are reduced using a molten tetrachloroaluminate catalyst. The catalyst, which is comprised of a metal cation and a tetrachloroaluminate anion, provides a site for the molecular weight reduction reaction. It has been discovered that the ability of any given tetrachloroaluminate catalyst to attract and retain specific components of a hydrocarbon feedstock at the reaction site and the ability to release subsequently formed products from the reaction site is a function of the electronegativity of the catalyst's metal cation and the polarity of the feedstock components and products. A catalyst having a cation of relatively high electronegativity more strongly attracts and retains polar feedstock components than a catalyst having a cation of lower electronegativity. Conversely, a catalyst having a cation of high electronegativity does not readily release polar products, while a catalyst having a cation of low electronegativity readily releases polar products. Therefore, based on the electronegativity of the catalyst cation, an optimum catalyst is selected for attracting and retaining specific feedstock components as well as for releasing desirable products formed from these components.

BEST MODE FOR CARRYING OUT THE INVENTION

The present invention substantially reduces the molecular weights of specific hydrocarbons in the presence of a selected molten tetrachloroaluminate catalyst. The hydrocarbons are components comprising a hydrocarbon liquid feedstock. In practice, useful feedstocks are liquids, such as liquefied or solvent refined coal, asphalt, including asphaltenes and preasphaltenes, tar, shale oil, petroleum residual oils, oils extracted from tar sands, and heavy petroleum crude oils boiling below about 850° C. In general, virtually any hydrocarbon feedstock having components which can be liquefied at the process conditions specified below can be utilized herein.

The term "products" as used herein refers to the mixture of hydrocarbon compounds obtained from the catalytic reaction of the feedstock and "product" refers to an individual compound within the mixture. In many cases it is preferable that the products have a hydrogen to carbon ratio greater than that of the feedstock. A wide number of liquid products are possible subject to the limitation that the molecular weight of substantially each individual product is below the molecular weight range of the hydrocarbon feedstock or alternatively the average molecular weight of the combined liquid products is less than the average molecular weight of the hydrocarbon feedstock, although an individual product may have a molecular weight within the range of the hydrocarbon feedstock.

The catalyst is a tetrachloroaluminate catalyst defined herein as a compound or a mixture of compounds, each compound containing a tetrachloroaluminate anion and an appropriately selected cation other than aluminum. Exemplary catalysts include $NaAlCl_4$, $KAlCl_4$, $Zn(AlCl_4)_2$, and mixtures thereof. In combination with any of the tetrachloroaluminate catalysts, $HAlCl_4$ may be used as a co-catalyst.

It has been discovered that if one desires to treat specific components of the hydrocarbon feedstock, it is necessary to select an appropriate tetrachloroaluminate catalyst.

Use of the singular term "cation" in the following discussion refers not only to a single species of cation but also collectively to multiple species of cations where the catalyst is a mixture of compounds. The term "retain" as used herein is not specific to any particular mechanism by which a reactant is held to the reaction site of a catalyst, although adsorption is a likely mechanism. Similarly, the term "release" is not specific to any mechanism for rejecting a product from the reaction site, although desorption is a likely mechanism.

The polarity of the catalyst is functionally related to the electronegativity of its cation. A cation having a relatively high electronegativity such as zinc imparts a more polar character to the resulting tetrachloroaluminate catalyst. As the electronegativity of the cation decreases, the polarity of the catalyst correspondingly decreases. Thus, a tetrachloroaluminate catalyst containing sodium, which has a lower electronegativity than zinc, is less polar than the catalyst containing zinc. Similarly, a catalyst containing potassium is even less polar because the electronegativity of potassium is less than sodium.

The electronegativity of the catalyst cation and corresponding polarity of the catalyst determine the specific hydrocarbon feedstock components which are attracted and retained by the catalyst. A high polarity catalyst attracts and retains hydrocarbon components exhibiting a wide range of polarities, e.g., paraffins to aromatics, although high polarity components, e.g., aromatics, are more strongly attracted and retained. In contrast, low polarity catalysts attract and retain only high polarity hydrocarbon components. Once the retained components have reacted, the polarity of the catalyst also determines the rate and relative ease with which catalyst releases the resulting products. Using a catalyst which has a lower polarity than that of the product ensures relatively easy release of the product. Where the product is non-polar, the polarity of the catalyst is not as critical for release.

According to the present invention, a tetrachloroaluminate catalyst is selected which optimizes both criteria: (1) the ability to attract and retain specific hydrocarbon feedstock components at the catalyst reaction site; and (2) the ability to release desirable products from the reaction site. The optimum tetrachloroaluminate catalyst is predicted from the electronegativity of its metal cation which is functionally related to the polarity of the catalyst as shown above.

The tetrachloroaluminate catalyst is manufactured by mixing aluminum chloride ($AlCl_3$) with a second metal chloride salt, in about a one to one molar ratio at about 155° to about 225° C. for about 5 to about 30 minutes to produce the molten tetrachloroaluminate catalyst. It is essential that substantially all of the second metal chloride salt is converted to the tetrachloroaluminate catalyst so that substantially no excess unreacted second metal chloride salt remains in the molten catalyst when it is contacted with the hydrocarbon feedstock. To ensure this, the tetrachloroaluminate catalyst is preferably made by using a molar ratio of $AlCl_3$ to second metal chloride salt slightly greater than one to one such that there is about 1 to 10 mole percent excess of $AlCl_3$ in the reaction mixture. During the course of the reaction substantially all of the second metal chloride salt is converted to the tetrachloroaluminate catalyst. None of the excess $AlCl_3$ retained in the molten catalyst because within the recited temperature range substantially all of the excess $AlCl_3$ is vaporized from the molten catalyst. The resulting tetrachloroaluminate catalyst contains substantially no excess $AlCl_3$ or second metal chloride.

Water may be added to the catalyst during its manufacture and/or during the molecular weight reduction process in an amount such that the resulting catalyst contains from about 1 to about 25 mole percent water and preferably from about 5 to about 15 mole percent water. It is essential that at no time during the process does the amount of water in the catalyst exceed 25 mole percent.

The process for converting hydrocarbon liquid feedstock components into lower molecular weight products can be operated near atmospheric pressure although it is often advantageously operated at elevated pressures up to about 14,200 kPa (about 140 atm). The reaction temperature at which the feedstock and catalyst are contacted is about 350° to about 550° C. The contact time of the hydrocarbon feedstock with the catalyst is from about 0.25 to about 4.0 hours (pound catalyst per pound feed per hour).

In operation, the process employs a purge gas, which is typically recycled, to remove the liquid products from the catalyst. The purge gas, present in an amount sufficient to effect product removal, is either an inert gas, such as nitrogen, helium and the other Inert Gases of the Periodic Table, methane and other low molecular weight paraffins, etc., or a reactive gas, such as hydrogen, carbon monoxide, and low molecular weight aromatics and olefins. Mixtures of inert and reactive gases can also be used. The purge gas can also contain a quantity of hydrogen chloride gas to counteract the introduction of oxygen as a hydrocarbon feedstock contaminant. Oxygen undesirably converts the catalyst from the chloride to the oxide form.

These and other aspects of the invention may be best understood by reference to the following example which is offered by way of illustration and not by way of limitation.

EXAMPLE

Three tetrachloroaluminate catalysts having metal cations of different electronegativity are contacted with hydrocarbons of different polarity. The hydrocarbons and catalysts are maintained at a temperature between 370° and 400° C. and about atmospheric pressure. The hydrocarbon retention of each catalyst is expressed in the Table below as a ratio of the weight of hydrocarbon retained by the catalyst per unit weight of catalyst. The hydrocarbons listed in the Table are in order of increasing polarity expressed in Debye Units and the catalysts are in order of decreasing electronegativity values of their metal cation.

TABLE

| Hydrocarbon | Catalyst | Hydrocarbon Retention | Hydrocarbon Polarity | Cation Electronegativity |
| --- | --- | --- | --- | --- |
| decane | Zn(AlCl$_4$)$_2$ | 0 | 0 | 1.65 |
| decane | NaAlCl$_4$ | 0 | 0 | 0.93 |
| decane | KAlCl$_4$ | 0 | 0 | 0.82 |
| o-xylene | Zn(AlCl$_4$)$_2$ | 0.22 | 0.45 | 1.65 |
| o-xylene | NaAlCl$_4$ | 0.03 | 0.45 | 0.93 |
| o-xylene | KAlCl$_4$ | 0.00 | 0.45 | 0.82 |
| quinoline | Zn(AlCl$_4$)$_2$ | 1.00 | 2.18 | 1.65 |
| quinoline | NaAlCl$_4$ | 0.58 | 2.18 | 0.93 |
| quinoline | KAlCl$_4$ | 0.14 | 2.18 | 0.82 |
| diethylamine | Zn(AlCl$_4$)$_2$ | 0.51 | 1.11 | 1.65 |
| diethylamine | NaAlCl$_4$ | 0.24 | 1.11 | 0.93 |
| diethylamine | KAlCl$_4$ | 0 | 1.11 | 0.82 |
| n-methyl-2-pyrrolidone | Zn(AlCl$_4$)$_2$ | >1.90 | 4.09 | 1.65 |
| n-methyl-2-pyrrolidone | NaAlCl$_4$ | >1.20 | 4.09 | 0.93 |
| n-methyl-2-pyrrolidone | KAlCl$_4$ | 0.50 | 4.09 | 0.82 |

The decane retention value on each of catalysts tested is approximately zero. This indicates that a more polar catalyst (i.e., a catalyst having a more electronegative cation) than the most polar catalyst tested, Zn(AlCl$_4$)$_2$, is required to effectively attract and retain the very low polarity species, decane, for reaction. However, if decane was a product, either of the three catalysts could be selected because they all readily release the very low polarity decane as shown by their retention values of approximately zero. Zn(AlCl$_4$)$_2$ or a more polar catalyst should be selected if a catalyst is required to attract and retain the hydrocarbon feedstock component, o-xylene. Of the catalysts tested, Zn(AlCl$_4$)$_2$ is selected because it has the highest o-xylene retention value, 0.22. KAlCl$_4$ or a less polar catalyst should be selected if o-xylene is the desired product since KAlCl$_4$ has the lowest o-xylene retention value, approximately zero, of the catalyst tested. This indicates that KAlCl$_4$ most readily releases the o-xylene product.

The case of n-methyl-2-pyrrolidone reflects the balancing considerations required when reacting a multicomponent hydrocarbon feedstock containing very polar hydrocarbons. Because the pyrrolidone is relatively polar, it is strongly attracted and retained by the more polar catalysts tested, i.e., Zn(AlCl$_4$)$_2$ and NaAlCl$_4$. The retained pyrrolidone tends to form an undesirable polymer which is not readily released by the catalyst. The polymer blocks the catalyst reaction sites, preventing the formation of more desirable products from the remaining feedstock components. Therefore one should select a less polar catalyst (i.e., one having a less electronegative cation), such as KAlCl$_4$, for contacting feedstocks containing very polar compounds, such as pyrrolidone, which form undesirable products. Since KAlCl$_4$ adsorbs much less pyrrolidone than more polar catalysts due to the lower electronegativity of the potassium cation, reaction sites are available for obtaining more desirable products from the feedstock which are readily released by the catalyst.

Finally, it is important to note that any of the above-cited catalyst compounds could be mixed in combination to produce a catalyst having a desired intermediate polarity.

Although the foregoing invention has been described by way of example for purposes of clarity of understanding, it will be obvious that certain changes and modifications may be practiced within the scope of the invention, as limited only by the scope of the appended claims.

I claim:

1. A process of converting a hydrocarbon feedstock in the presence of a tetrachloroaluminate catalyst containing a non-aluminium metal cation to lower molecular weight products comprising:
    selecting said tetrachloroaluminate catalyst based on the electronegativity of the non-aluminum metal cation of said catalyst, to substantially retain specific feedstock components on the selected catalyst and substantially release the products from the selected catalyst and wherein the selected catalyst contains substantially no excess AlCl$_3$; and
    contacting the hydrocarbon feedstock with the selected catalyst in a molten state at a temperature from about 350° C. to about 550° C. and a pressure from about atmospheric to about 14,200 kPa to obtain the lower molecular weight products.

2. The process of claim 1 wherein the tetrachloroaluminate catalyst is selected from the group consisting of NaAlCl$_4$, Zn(AlCl$_4$)$_2$, KAlCl$_4$, and mixtures thereof.

3. The process of claim 1 wherein an HAlCl$_4$ co-catalyst is added to the selected catalyst.

4. The process of claim 1 wherein the contact time between the feedstock and the catalyst is from about 0.25 to about 4.0 hours.

5. The process of claim 1 further comprising separating the products from said selected catalyst by purging with a purge gas.

6. The process of claim 5 wherein at least a portion of the purge gas is reactive.

7. The process of claim 6 wherein the reactive purge gas is selected from the group consisting of hydrogen, carbon monoxide, low molecular weight aromatics, low molecular weight olefins, and mixtures thereof.

8. The process of claim 5 wherein the purge gas is inert.

9. The process of claim 8 wherein the inert purge gas is selected from the group consisting of nitrogen, helium, methane and other low molecular weight paraffins, and mixtures thereof.

10. The process of claim 5 wherein the purge gas is separated from the product and recycled.

11. The process of claim 1 wherein the hydrogen to carbon ratio of the products is greater than the hydrogen to carbon ratio of the hydrocarbon feedstock.

12. The process of claim 1 wherein the products have a lower average molecular weight than the average molecular weight of the feedstock.

13. The process of claim 1 wherein substantially each product has a molecular weight below the molecular weight range of the feedstock.

* * * * *